United States Patent Office 3,238,202
Patented Mar. 1, 1966

3,238,202
AMIDES OF O,O-DIALKYLDITHIOPHOSPHORYLACETIC ACIDS
Cesare Augusto Peri and Giorgio Rossi, Milan, Italy, assignors to Montecatini Società Generale per l'Industria Mineraria e Chimica, Milan, Italy, a corporation of Italy
No Drawing. Filed Apr. 30, 1962, Ser. No. 191,313
Claims priority, application Italy, May 2, 1961, 8,069/61; Apr. 11, 1962, 7,164/62
12 Claims. (Cl. 260—247.1)

Our invention relates to compounds having the formula $$\begin{array}{c} RO \\ R_1O \end{array}\!\!\!\diagdown\!\!\!\!\underset{\underset{S}{\|}}{P}\!\!-\!S\!-\!CH_2\!-\!CO\!-\!N\!\!\diagup\!\!\!\begin{array}{c} R_2 \\ R_3 \end{array} \quad (1)$$

wherein R and $R_1$ are the same or different low molecular weight alkyl radicals with a linear or branched chain, containing a fluorine atom, and $R_2$ and $R_3$ are the same or different low molecular weight linear alkyl radicals, a —$CH_2SR'$, —$CH_2OR'$ (wherein $R'$ is an alkyl radical) a —CN group and hydrogen or form together with the nitrogen atom a morpholine nucleus.

Our invention has a further object the miticidal (with a prevailingly ovicidal action) and insecticidal compositions containing one or more compounds comprised in the general Formula 1.

It is known that the alkylamides of O,O-dialkyldithiophosphorylacetic acid have a pesticidal activity. The activity of some compounds belonging to this class is exerted not only against insects but also against mites and their eggs.

We have found that substitution of a fluorine for a hydrogen atom in the alkyl radicals of the ester groups, produces superior results. The activity spectrum against mites and insects becomes in fact more complete.

The distinctive character deriving therefrom consists of the fact that eggs of female mites contacting vegetative surfaces treated with said substances and of female mites sprayed with said substance are inhibited from hatching, when laid on either treated or nontreated vegetative surfaces. Moreover, said substances exert an ovicidal effect also through ingestion by female mites.

These characteristics, in addition to adult-killing activity, make these compounds particularly suitable for the control of mites and insects.

The formulations used for this purpose may contain one or more active substances comprised in Formula 1, associated with substances commonly used in formulation techniques as auxiliary substances, such as solvents, diluents, adhesive, wetting agents and dispersing agents. The active substances hereof may also be suitably associated with active substances of a different nature to give formulations having a different activity spectrum.

By way of illustration, toxicity values towards warm-blooded animals of a compound of our invention are:

LD50, acute toxicity per os on a white mouse, expressed as mg./kg. of N-methylamide of di-(betafluoroethyl)dithiophosphorylacetic acid=78 (while that of paranitrophenyldiethyl-thiophosphate is 8.2).

LD50, acute toxicity by intravenous application on white mouse, expressed as mg./kg. of the above-mentioned compound=85.5 (while that of paranitrophenyl-diethylthiophosphate is 5.7).

The compounds of our invention are prepared by reacting the alkaline salts of O,O-di(fluoro-alkyl)dithiophosphoric acids with chloroacetamide or N-alkyl-chloroacetamides according to the following equation:

$$\begin{array}{c} RO \\ R_1O \end{array}\!\!\!\diagdown\!\!\!\!\underset{\underset{S}{\|}}{P}\!\!-\!SMe + Cl\!-\!CH_2\!-\!CON\!\!\diagup\!\!\!\begin{array}{c} R_2 \\ R_3 \end{array} \longrightarrow$$

$$\begin{array}{c} RO \\ R_1O \end{array}\!\!\!\diagdown\!\!\!\!\underset{\underset{S}{\|}}{P}\!\!-\!S\!-\!CH_2\!-\!CON\!\!\diagup\!\!\!\begin{array}{c} R_2 \\ R_3 \end{array} + MeCl$$

wherein R, $R_1$, $R_2$ and $R_3$ have the aforementioned meaning and Me is an alkaline metal.

The following examples illustrate the preparation process and the miticidal, ovicidal and insecticidal activity of the compounds comprised in Formula 1, but it is understood that these examples do not limit the scope of the present invention.

Example 1

14 g. of chloroacetamide are added to a solution of 39 g. of the potassium salt of O,O-di-(betafluoroethyl)dithiophosphoric acid in 80 cc. of acetone. The reaction mixture is refluxed for 1 hour and is then cooled. KCl is filtered off under suction. The solvent is evaporated under reduced pressure and the residue is dissolved in 50 cc. of methylene chloride; after washing with water (30 cc.), drying on anhydrous $Na_2SO_4$ and evaporation under reduced pressure, 27 g. of an oily substance, consisting essentially of the amide of O,O-di-(betafluoroethyl)-dithiophosphorylacetic acid, are obtained.

$$\begin{array}{c} F\!-\!CH_2\!-\!CH_2O \\ F\!-\!CH_2\!-\!CH_2O \end{array}\!\!\!\diagdown\!\!\!\!\underset{\underset{S}{\|}}{P}\!\!-\!S\!-\!CH_2\!-\!CO\!-\!NH_2$$

N calculated=5.01%
N found=4.68–4.57%

Example 2

40.8 g. of N-methyl-chloro-acetamide are added to a solution of 97.5 g. of sodium salt of O,O-di(beta-fluoroethyl)dithiophosphoric acid in 200 cc. of water and the mixture is agitated at room temperature (20–25° C.) for 70 hours. The oily phase is separated by decantation, the aqueous phase is extracted with 50 cc. of methylene chloride; the extract is added to the oily phase and the entire organic phase is washed twice with water (50 cc. each time), thus obtaining, as a residue (after drying on $CaCl_2$ an evaporating under reduced pressure), 83 g. of an oily substance consisting essentially of the N-methylamide of O,O-di-(betafluoroethyl)-dithiophosphorylacetic acid, $$\begin{array}{c} F\!-\!CH_2\!-\!CH_2O \\ F\!-\!CH_2\!-\!CH_2O \end{array}\!\!\!\diagdown\!\!\!\!\underset{\underset{S}{\|}}{P}\!\!-\!S\!-\!CH_2\!-\!CO\!-\!NH\!-\!CH_3$$

having:
N calculated=4.77%
N found=4.73–4.65%
$n_D^{20}=1.5229$
$D_4^{20}=1.386$

Example 3

27 g. of isopropyl chloroacetamide are added to 112 cc. of an aqueous solution of sodium $\beta,\beta$-difluoro-ethyl-dithiophosphate having a concentration of 1.98 mols/liter and the entire reaction mixture is agitated at room temperature (about 20° C.) for 15 hours. An oily layer is formed which is separated by decantation; the mother liquors are extracted with methylene chloride and the extract obtained is added to the organic phase. After washing with water (50 cc. twice) and drying on $CaCl_2$, the solvent is removed under reduced pressure.

40.5 g. of a clear yellow oil, consisting essentially of N-monoisopropylamide of O,O-di(beta-fluoroethyl)dithiophosphorylacetic acid are obtained. A suitable purification can be carried out by dissolving the raw product in ethanol and by reactional precipitation with water.

The product thus obtained, has

N calculated=4.35%; N found=4.38–4.45%
P calculated=9.64%; P found=9.12–9.13%

*Example 4*

By using 118 cc. of an aqueous solution of sodium β,β-difluoroethyldithiophosphate with a concentration of 1.98 mols/liter and 24.3 g. of dimethylchloroacetamide, with the modalities practically similar to those described in Example 1, 51 g. of a clear yellow oil, consisting essentially of the N-dimethylamide of O,O-di-(beta-fluoroethyl)dithiophosphorylacetic acid are obtained.

The raw product has:

N calculated=4.55%; N found=4.41–4.47%
P calculated=10.88%; P found=9.38–9.78%

*Example 5*

By using 118 cc. of an aqueous solution of sodium β,β-difluoroethyldithiophosphate with a concentration of 1.98 mols/liter, and 24.3 g. of ethylchloroacetamide, with the modalities practically similar to those described in Example 1, 43 g. of a clear yellow oil consisting essentially of the N-ethylamide of O,O-di(beta-fluoroethyl)dithiophosphorylacetic acid are obtained. The product after purification by dissolution in ethanol and fractional precipitation with water, has N calculated=4.55%; N found=4.86–4.91%
P calculated=10.08%; P found=9.50–9.43%

*Example 6*

By using 118 cc. of an aqueous solution of sodium β,β-difluoroethyldithiophosphate with a concentration of 1.98 mols/liter, and 32.2 g. of α-cyan-isopropyl chloroacetamide, with the modalities practically similar to those described in Example 1, 58 g. of a clear yellow oil, substantially consisting of N (α-cyano-isopropyl) amide of O,O-di-(beta-fluoro-ethyl)dithiophosphorylacetic acid are obtained. The product after purification by dissolution in ethanol and fractional precipitation with water has:

N calculated=8.08%; N found=8.12–8.13%
P calculated=8.94%; P found=8.42–8.49%

*Example 7*

115 cc. of an aqueous solution of sodium-beta-difluoroethyldithiophosphate with a concentration of 2 mols/l. are added to a solution of 30.6 g. methylmercaptomethylene chloroacetamide (obtained by condensation between N-methyldichloroacetamide and methylmercaptane in a medium acidified with hydrochloric acid (see Gazzetta Chimica Italiana, 89, 1330 (1959)) in 50 cc. acetone and the whole is agitated.

After 48 hours the two layers thus formed are separated by decantation; the organic layer is made free from the most part of the acetone by evaporation under reduced pressure, while the residue is poured in water (80 cc.), retaken with methylenechloride (50 cc.) and further washed with water (80 cc.).

The chloromethylene extract is dried on CaCl₂ and then evaporated under reduced pressure until a constant weight is reached.

Thus, 49 g. oily substance, which after some time solidifies completely.

A sample crystallized from ethyl ether has melting point 43.5°–45° C.; the analysis gives the following results:

P calculated=9.12%
P found=9.10–9.12%

Said substance consists of the methylmercapto methylamide of the O,O-di-(betafluoroethyl)dithiophosphorylacetic acid having the formula:

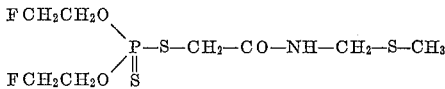

*Example 8*

115 cc. of an aqueous solution of sodium beta,beta-difluoroethyldithiophosphate with a concentration of 2 mols/l. are added to a solution of 33.4 g. ethylmercaptomethyl chloroacetamide (see Gazzetta Chimica Italiana 89, 1330 (1959)) in 50 cc. acetone, and the whole is agitated.

By working in a way substantially equal to what has been described in the preceding example, 60.5 g. of oily substance are obtained which gives to the analysis:

P calculated=8.76%
P found=8.59%

Said substance consists of the N-ethylmercapto methylamide of the O,O-di-(betafluoroethyl)dithiophosphorylacetic acid, having the formula:

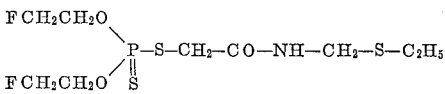

*Example 9*

98 cc. of an aqueous solution of sodium beta,beta-difluoroethyldithiophosphate with a concentration of 2 mols/l. are added to 23.3 g. methoximethylenchloroacetamide, clear uncolored liquid having a boiling point at 0.6 mm. Hg. at=79° C. (prepared by heating the N-methylchloroacetamide with an excess of methanol in a medium acidified with anhydrous hydrochloric acid) and the whole is stirred at 30–35° C. for about 3 hours; then the solution is left for 15 hours.

The oily phase thus formed is separated by decantation and the aqueous phase is extracted with methylene chloride (50 cc.); the oily phase and the chloromethylene extract brought together again are washed with water (80 cc.) twice.

After having dried on CaCl₂ and evaporated under reduced pressure, 45 g. of a clear oily substance are obtained as residue and this gives to the analysis:

P calculated=9.58%
P found=9.44%

Said substance consists of the methoxymethylamide of the O,O-di-(betafluoroethyl)dithiophosphorylacetic acid, having the formula:

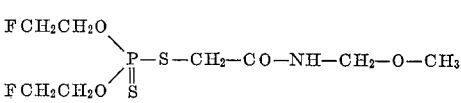

*Example 10*

78 cc. of an aqueous solution of sodium beta,beta-difluoroethyldithiophosphate with a concentration of 2 mols/l. are added to 22 g. n-propoxymethylenchloroacetamide, clear uncolored liquid having a boiling point at 0.4 mm. Hg at 86–90° C. (prepared by heating N-methylolchloroacetamide with n-propyl alcohol, in an ethyl acetate solution, in the presence of anhydrous hydrochloric acid) dissolved in 50 cc. acetone and the whole is agitated at 40°–45° C. for 3 hours.

After having left the mixture for 15 hours, the organic phase is separated, the most part of the acetone is removed under reduced pressure, the residue is retaken with methylene chloride (50 cc.) and the residue is washed twice with water.

After having dried on CaCl₂ and evaporated under reduced pressure, 42.5 g. of an oily substance, having a slight yellow colour are obtained as residue and the analysis gives:

P calculated=8.81%
P found =8.98%

Said substance consists of the n-propoxymethylamide of the O,O - di - (betafluoroethyl)dithiophosphorylacetic acid, having the formula:

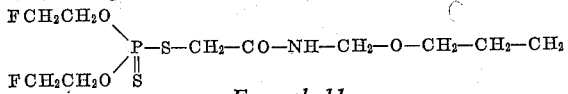

Example 11

117 cc. of an aqueous solution of sodium beta,beta-difluoro-ethyldithiophosphate with a concentration of 1.98 mols/l. are added to 33 g. chloroacetyl morpholine and the whole is agitated for 6 hours at 35°–40° C.

After having left the mixture for 15 hours, an extraction is carried out using 70 cc. methylene chloride; said extract is washed with water (100 cc.) and then with a 2% NaHCO$_3$ solution (70 cc.) and then with water again (100 cc.).

After drying on CaCl$_2$ and evaporation under reduced pressure, 64 g. residue are obtained, which consists of a clear oily phase the analysis of which gives:

P calculated=8.86%
P found=8.45–8.49%

Said substance consists of the morpholinamide of the O,O-di-(betafluoroethyl)dithiophosphorylacetic acid, having the formula:

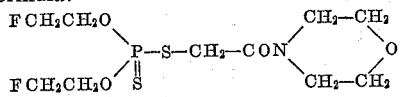

Example 12

A spray formulation which can be used for the control of mites or mite eggs, is prepared by dissolving 20 parts of N-mehylamide of O,O-di-(beta-fluoroethyl)dithiophosphorylacetic acid (obtained as in Example 2) in 75 parts of methyl Cellulose (monomethyl ether of diethylene glycol) and then adding 5% of an emulsifier while agitating at room temperature.

In the following examples are reported some data relating to the biological activity of N-methylamide of O,O-di(beta-fluoroethyl)dithiophosphorylacetic acid obtained by experimental tests carried out for determining the miticidal and ovicidal action according to the following procedure:

The following test mites were used:

*Tetraanychus telarius* L.
*Metatetranychus ulmi* Kich., strain sensible (S) to the action of other miticides.
*Metatetranychus ulmi* Koch., resistant strain (R) i.e., relatively less susceptible to the action of other miticides.

With *Tetranychus telarius* all tests were carried out on French bean plants in pots. With *M. ulmi* on the contrary they were executed in part on 1-year-old apple trees grown in pots and in part on 2-year-old apple trees of the same culture, grown in an open field. The techniques used for these tests were according to the following fundamental scheme:

*Tests with plants in pots.*—From apple or French bean leaves, discs having a diameter of 2.8 cm. are cut. These discs are sprayed with the products to be tested, before or after infestation with adult mites or with mite eggs. Discs of the same size are used for transferring adults thereon (treated or not treated).

*Tests with plants in open field.*—The apple trees are sprayed by means of a pressure pump, some leaves are taken at various intervals and cut in the form of discs which are then infested with adults.

In both kinds of tests, the discs with the mites and the eggs, are kept at 24–26° C. on wet cotton in open Petri boxes for several days after hatching of the controls.

The percentages of the unhatched eggs and the percentage of the dead mites among the newborn mites are are then calculated.

Example 13

Persistence of activity against *M. ulmi* eggs (S and R) deposited by untreated female individuals onto apple tree leaves in open field, sprayed with a preparation containing 0.4% of active ingredients.

Eggs laid onto the upper side of the leaves:

| Mites | Time elapsed between treatment of the leaves and the ova-deposition days | Percentages of unhatched eggs and of dead newborn mites | |
|---|---|---|---|
| | | N-methylamide of O,O-di(betafluoroethyl)dithiophosphorylacetic acid | |
| | | Eggs | Newborn mites |
| *M. ulmi* S | a 1 | 100 | ------- |
| | a 2 | 100 | ------- |
| | b 20 | 52 | (c) |
| | b 30 | 35 | (c) |
| *M. ulmi* R | b 1 | 79 | 4 |
| | b 2 | 83 | (c) |
| | b 3 | 87 | 14 |
| | b 6 | 72 | 34 | a Date of the treatment: July 29, 1960.
b Date of the treatment: Sept. 13, 1960.
In this test with *M. ulmi* S, the apple trees in open field were subjected to very frequent rains, sometimes for several consecutive days, during the time (20–30 days) elapsed between the treatment and the determination of the ovicidal activity. Nevertheless the product continued to show its activity on a high percentage of eggs.
c Not determined date.

Example 14

Persistence of activity against *M. ulmi* S eggs deposited by treated female individuals onto treated leaves.

| Product | Concentration of active substance, percent | Percentages of unhatched eggs and of dead newborn mites on treated leaves | | | | |
|---|---|---|---|---|---|---|
| | | After 1 day | | After 3 days | | After 5 days |
| | | Eggs | Newborn mites | Eggs | Newborn mites | Eggs |
| N-monomethylamide of O,O-di(betafluoroethyl)dithiophosphorylacetic acid. | 0.04 | 31 | 29 | 70 | 29 | (1) |
| | 0.1 | 59 | 37 | 97 | 50 | (1) |
| | 0.4 | 85 | 41 | 100 | ------ | (1) |

1 The adulticidal activity of the product did not allow any evaluation of the residual ovicidal effect.

Example 15

Persistence of activity against *T. telarius* eggs laid by treated female individuals onto treated leaves. Eggs laid onto the lower page of leaves.

| Product | Concentration of active substance, percent | Percentages of unhatched eggs and of dead newborn mites on treated leaves | | | |
|---|---|---|---|---|---|
| | | After 1 day | | After 3 days | After 5 days |
| | | Eggs | Newborn mites | Eggs | Eggs |
| N-monomethylamide of O,O-di(betafluoroethyl) dithiophosphorylacetic acid. | 0.04<br>0.1<br>0.4 | 58<br>66<br>59 | 18<br>72<br>100 | 100<br>(1)<br>100 | (1)<br>(1)<br>(1) |

[1] The adulticidal activity of the product did not allow any evaluation of the residual ovicidal effect.

*Example 16*

Effect of spraying adult mites on the hatching of *M. ulmi* (S and R) eggs and of *T. telarius* eggs laid (one hour after the treatment) onto untreated leaves.

| Mites | Concentration of active substance, percent | Percentage of unhatched eggs and of dead newborn mites | |
|---|---|---|---|
| | | N-monomethylamide of O,O-di-(betafluoroethyl)dithiophosphorylacetic acid | |
| | | eggs | Newborn mites |
| *M. ulmi* R | 0.04<br>0.1<br>0.4 | 30<br>29<br>73 | 6<br>6<br>6 |
| *M. ulmi* S | 0.04<br>0.1<br>0.4 | 39<br>44<br>91 | |
| *T. telarius* | 0.04<br>0.1<br>0.4 | 45<br>58<br>83 | <br>1<br>1 |

*Example 17*

Effectiveness of N-monomethylamide of O,O-di(betafluoroethyl)dithiophosphorylacetic acid directly sprayed onto adult mites on the leaves.

| Mites | LD 95 (°/oo) [1] N-monomethylamide of O,O-di(betafluoroethyl)dithiophosphorylacetic acid |
|---|---|
| *M. ulmi* S | 1 |
| *M. ulmi* R | 1 |
| *T. telarius* | 0.05 |

[1] DL 95 (°/oo) = minimum °/oo concentration of the active substance of the sprayed solution, capable of killing 95% of adults present on the leaves during the treatment.

The insecticidal and, more particularly, miticidal properties of the compounds comprised in general Formula 1 are demonstrated by the following examples:

*Example 18*

The data reported in the following table were obtained from a test carried out by introducing 5-day-old female flies into beakers previously treated with controlled amounts of benzene solutions of the active substances under examination, and leaving the flies in contact with the treated wall for 20 hours.

ACTIVITY ON FLY (*M. DOMESTICA*) BY TARSAL CONTACT

| Products | Dose mg./m.[2] | Percent mortality after 20 hours |
|---|---|---|
| Amide of O,O-di (betafluoroethyl) dithiophosphorylacetic acid | 50<br>30<br>20<br>10 | 99<br>94<br>78<br>27 |
| N-methylamide of O,O-di-(betafluoroethyl) dithiophosphorylacetic acid. | 50<br>30<br>20<br>10 | 100<br>94<br>60<br>26 |

*Example 19*

The data reported in the following table were obtained from a test carried out by treating (by immersion) a population of virgino-parous apterous female aphids, grown in a laboratory on bean plants under standard conditions, with an aqueous dispersion of the suitably formulated substances to be examined.

Activity against aphids (*Aphis fabae*) by immersion:

| Products | Dose active substance, p.p.m. | Percent mortality after 20 hours |
|---|---|---|
| Amide of O,O-di (betafluoroethyl) dithiophosphorylacetic acid. | 400.00<br>200.00<br>100.00<br>50.00 | 100<br>98<br>84<br>11 |
| N-methylamide of O,O-di-(betafluoroethyl) dithiophosphorylacetic acid. | 20.00<br>10.00<br>5.00<br>2.50<br>1.25 | 100<br>97<br>86<br>41<br>10 |
| N-isopropylamide of O,O-di (betafluoroethyl) dithiophosphorylacetic acid. | 50.00<br>5.00 | 100<br>75 |
| N-dimethylamide of O,O-di (betafluoroethyl) dithiophosphorylacetic acid. | 50.00<br>5.00 | 100<br>93 |
| N-ethylamide of O,O-di-(betafluoroethyl) dithiophosphorylacetic acid. | 50.00<br>5.00 | 100<br>66 |
| α-cyan-isopropylamide of O,O-di (betafluoroethyl) dithiophosphorylacetic acid. | 50.00<br>5.00 | 100<br>59 |
| Mercaptomethylamide of O,O-di (betafluoroethyl) dithiophosphorylacetic acid. | 50.00 | 96 |
| Mercaptoethylamide of O,O-di(betafluoroethyl)-dithiophosphorylacetic acid. | 50.00 | 93 |
| Methoxymethylamide of O,O-di-(betafluoroethyl)-dithiophosphorylacetic acid. | 50.00 | 97 |
| Propoxymethylamide of O,O-di-(betafluoroethyl)-dithiophosphorylacetic acid. | 50.00 | 96 |
| Morpholinamide of O,O-di(betafluoroethyl) dithiophosphorylatic acid. | 50.00 | 100 |

Example 20

The data reported in the following table were obtained in a laboratory test carried out as follows: the hypogeous portion of young bean plants infested with aphids (*Aphis fabae*) is introduced into colored glass pots containing aqueous dispersions of the product to be examined.

The pots are kept under suitable conditions for the insects for 7 days, noting daily the mortality of the aphids living on the epigeous portion of the plants and taking the final reading on the seventh day.

APHICIDAL ACTIVITY AGAINST *APHIS FABAE* BY SYSTEMATIC ABSORPTION

| Products | Dose active substance, p.p.m. | Percent mortality 7th day |
|---|---|---|
| Amide of O,O-di(betafluoroethyl)dithiophosphorylacetic acid. | 20 | 100 |
| N-methylamide of O,O-di-(beta-fluoroethyl)-dithiophosphorylacetic acid. | 1.33<br>0.88<br>0.59 | 100<br>91<br>40 |
| N-isopropylamide of O,O-di(betafluoroethyl)di-thiophosphorylacetic acid. | 1.00<br>0.10 | 100<br>60 |
| N-dimethylamide of O,O-di(betafluoroethyl)di-thiophosphorylacetic acid. | 1.00<br>0.10 | 100<br>90 |
| N-ethylamide of O,O-di-(betafluoroethyl)dithiophosphorylacetic acid. | 1.00<br>0.10 | 100<br>94 |
| N-(α-cyan-isopropyl) amide of O,O-di(betafluoroethyl) dithiophosphorylacetic acid. | 1.00<br>0.10 | 100<br>60 |

Example 21

The data reported in the following table were obtained from a test carried out as follows: peach and apple twigs, whose leaves are infested, are sprayed with a formulation diluted to 0.001%, 0.01%, 0.1% and 1%, of active substance.

The tested material is then kept at 23–25° C. till the reading of the results (24 hours after the treatment).

Example 22

The data reported in the following table were obtained by a treatment (in all cases onto 3 peach trees) carried out in open field on July 26, 1960, by carefully spraying all foliage of the plant with a pump working at 30 atmospheres pressure. Before spraying, 20 sprouts highly and uniformly infested with mealy aphid, were marked on each plant of the single repetitions. On the sprouts, 24 and 72 hours respectively after the treatment, the disinfested leaves were counted.

Activity against peach mealy aphid (*Hyalopterus pruni* Geoffrey).

Intensity of the plant disinfestation evaluated at various times after the treatment.

| Experimental test | | Repetition No. | Infested leaves marked No. | Completely disinfested leaves | | | |
|---|---|---|---|---|---|---|---|
| Product | Dose | | | After 24 hours | | After 72 hours | |
| | | | | No. | Percent | No. | Percent |
| N-methylamide of O,O-di(betafluoroethyl)dithiophosphorylacetic acid. | 0.25°/oo | I<br>II<br>III | 116<br>103<br>105 | 115<br>103<br>105 | 99<br>100<br>100 | 116<br>103<br>105 | 100<br>100<br>100 |

Example 23

The data reported in the following table were obtained by a treatment carried out in open field on June 9, 1960 on peach plants infested with peach mealy aphid (*Hyalopterus pruni* Geoffrey). Since during the normal spraying treatments several individuals of this species (also due to the constant disposition on the lower page of leaves) can escape the spray, this test was effected in order to establish whether and with what intensity the product under examination is capable of acting on individuals which are not wetted directly by the spraying liquid, namely whether is has an indirect action. Accordingly, the product was applied by spraying at a pressure of 8 atmospheres, operating so that most of the leaves would not be wetted in their lower pages (i.e., without wetting the numerous aphids laying on the same leaves).

IMMEDIATE APHIDICIDAL ACTIVITY AGAINST VARIOUS APHID SPECIES OF AGRICULTURAL INTEREST, BY DIRECT SPRAYING

| Product | LD 95 (percent of active substance) on Aphis of various age | | | | |
|---|---|---|---|---|---|
| | Brachycaudus persicaeniger | Myzus persicae | Kezabura plantaginea | Myzus cerasi | Aphis pomi |
| N-methylamide of O,O-di(betafluoroethyl)dithiophosphorylacetic acid. | 1 | 1 | 0.1 | 0.1 | 0.1 |

The following evaluation of the effectiveness of the product to be tested was made:

| Experimental test | Reduction of the infestation | | | |
|---|---|---|---|---|
| | After 6 hours | After 24 hours | After 48 hours | After 72 hours |
| N-methylamide of O,O-di(betafluoroethyl)-dithiophosphorylacetic acid (formulation containing a 0.30°/₀₀ of active substance. | 50% ca. | Nearly total | Total | Total |

We claim:
1. Amide of O,O-di(betafluoroethyl)dithiophosphorylacetic acid.
2. N - methylamide of O,O-di(betafluoroethyl)dithiophosphorylacetic acid.
3. N-monoisopropylamide of O,O-di(betafluoroethyl) dithiophosphorylacetic acid.
4. N-dimethylamide of O,O-di(betafluoroethyl)dithiophosphorylacetic acid.
5. N - monoethylamide of O,O-di(betafluoroethyl)dithiophosphorylacetic acid.
6. N-(α-cyano-isopropyl)amide of O,O-di(betafluoroethyl)dithiophosphorylacetic acid.
7. Mercaptomethylamide of O,O - di(betafluoroethyl) dithiophosphorylacetic acid.
8. Mercaptoethylamide of O,O-di(betafluoroethyl)dithiophosphorylacetic acid.
9. Methoxymethylamide of O,O-di(betafluoroethyl)dithiophosphorylacetic acid.
10. Propoxymethylamide of O,O-di(betafluoroethyl)dithiophosphorylacetic acid.
11. Morpholinamide of O,O-di(betafluoroethyl)dithiophosphorylacetic acid.

12. An amide of the formula:

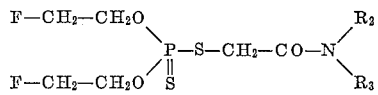

wherein $R_2$ and $R_3$ are each selected from the group consisting of lower lineal and branched alkyl, —$CH_2SR'$, wherein R′ is lower alkyl, $CH_2OR'$, wherein R′ has the aforementioned meaning, cyano and hydrogen, and $R_2$ and $R_3$ forming together with the nitrogen atom the morpholine group.

References Cited by the Examiner
UNITED STATES PATENTS

| | | | |
|---|---|---|---|
| 2,494,283 | 1/1950 | Cassaday et al. | 260—461 |
| 2,981,748 | 4/1961 | Metivier | 260—461 |
| 3,057,774 | 10/1962 | Baker et al. | 260—247.1 X |

IRVING MARCUS, *Primary Examiner.*